United States Patent
Bourlai et al.

(10) Patent No.: US 9,922,238 B2
(45) Date of Patent: *Mar. 20, 2018

(54) APPARATUSES, SYSTEMS, AND METHODS FOR CONFIRMING IDENTITY

(71) Applicant: West Virginia University, Morgantown, WV (US)

(72) Inventors: Thirimachos Bourlai, Morgantown, WV (US); Zenovy S. Wowczuk, Morgantown, WV (US); Walter A. Ferrell, Morgantown, WV (US); Steven R. Amerman, Morgantown, WV (US); Jay P. Wilhelm, Morgantown, WV (US); Nnamdi C. Osia, Morgantown, WV (US); Patrick R. Esposito, II, Morgantown, WV (US); Terrence H. Upton, Antioch, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,581

(22) Filed: Aug. 31, 2015

(65) Prior Publication Data

US 2016/0379042 A1    Dec. 29, 2016

Related U.S. Application Data

(63) Continuation-in-part of application No. 14/751,014, filed on Jun. 25, 2015, now Pat. No. 9,449,217.

(51) Int. Cl.
| | |
|---|---|
| *G06K 9/00* | (2006.01) |
| *G06T 5/50* | (2006.01) |
| *G06K 9/22* | (2006.01) |

(52) U.S. Cl.
CPC ..... *G06K 9/00288* (2013.01); *G06K 9/00221* (2013.01); *G06K 9/00228* (2013.01);
(Continued)

(58) Field of Classification Search
CPC ........... G06K 9/00288; G06K 9/00604; G06K 9/00228; G06K 9/6201; G06K 9/00268;
(Continued)

(56) References Cited

U.S. PATENT DOCUMENTS

| | | | |
|---|---|---|---|
| 7,069,149 B2 | 6/2006 | Goff et al. | |
| 7,931,194 B2 | 4/2011 | Keys | |

(Continued)

OTHER PUBLICATIONS

Nnamdi Osia and Thirimachos Bourlai. "Holistic and Partial Face Recognition in the MWIR Band using Manual and Automatic Detection of Face-based Features." 2012 IEEE Conference on Technologies for Homeland Security (HST). pp. 273-279 (Waltham, MA, Nov. 2012).

(Continued)

*Primary Examiner* — Sheela C Chawan
(74) *Attorney, Agent, or Firm* — Spilman Thomas & Battle, PLLC

(57) ABSTRACT

A system, apparatus, and method for confirming the identity of a person for access using an image of that person. The system includes a camera, a data storage device, a subject identification device, and a processor to compare a plurality of current images of the subject to a plurality of stored images of that subject and confirm that the subject live and an approved subject.

20 Claims, 8 Drawing Sheets

(52) U.S. Cl.
CPC ......... *G06K 9/00281* (2013.01); *G06K 9/228* (2013.01); *G06T 5/50* (2013.01); *G06K 9/00926* (2013.01); *G06T 2207/20221* (2013.01)

(58) Field of Classification Search
CPC ........... G06K 9/00221; G06K 9/00281; G06K 9/00248; G06T 7/0079
USPC ........ 382/100, 103, 115, 117, 118, 151, 162, 382/168, 169, 171, 172, 173, 181, 190, 382/254, 274, 305, 298, 289; 348/739, 348/744, 759, 760, 761; 702/16; 359/252, 250; 358/448, 443, 471, 403, 358/518

See application file for complete search history.

(56) References Cited

U.S. PATENT DOCUMENTS

| | | | |
|---|---|---|---|
| 7,972,266 B2* | 7/2011 | Gobeyn | A61B 3/113 348/222.1 |
| 8,295,557 B2* | 10/2012 | Wang | G06T 7/0081 382/118 |
| 8,326,001 B2* | 12/2012 | Free | G06K 9/00228 382/103 |
| 8,385,971 B2* | 2/2013 | Rhoads | G06F 17/30244 382/162 |
| 8,396,265 B1 | 3/2013 | Ross et al. | |
| 8,457,367 B1 | 6/2013 | Sipe et al. | |
| 8,542,879 B1 | 9/2013 | Nechyba et al. | |
| 8,558,663 B2 | 10/2013 | Newman et al. | |
| 2013/0027187 A1 | 1/2013 | Yepez | |
| 2014/0079296 A1 | 3/2014 | Cleland et al. | |
| 2015/0002392 A1* | 1/2015 | Kempinski | A61B 3/113 345/156 |

OTHER PUBLICATIONS

Thirimachos Bourlai, Arun Ross, and Anil Jain. "On Matching Digital Face Images Against Scanned Passport Photos." Proceedings of First IEEE International Conference on Biometrics, Identity and Security (BIdS). pp. 1-10 (Tampa, FL, Sep. 2009).

Thirimachos Bourlai, Arun Ross, and Anil K. Jain. "Restoring Degraded Face Images: A Case Study in Matching Faxed, Printed, and Scanned Photos", IEEE Transactions on Information Forensics and Security, vol. 6, No. 2 (Jun. 2011), pp. 371-384.

Antwan Clark and Thirimachos Bourlai. "Enhancing passport images for face recognition", SPIE Newsroom, Oct. 9, 2013.

Di Wen, Hu Han, and Anil K Jain. "Face Spoof Detection with Image Distortion Analysis", IEEE Transactions on Information Forensics and Security, vol. 10, No. 4 (Apr. 2015), pp. 746-761.

Gang Pan, Zhaohui Wu and Lin Sun (2008). "Liveness Detection for Face Recognition." in: Recent Advances in Face Recognition, Kresimir Delac, Mislay Grgic and Marian Stewart Bartlett (eds.), pp. 109-124. Vienna, Austria: InTech.

Unsang Park, Raghavender Reddy Jillela, Arun Ross, and Anil K. Jain, "Periocular Biometrics in the Visible Spectrum." IEEE Transactions on Information Forensics and Security. vol. 6, No. 1 (Mar. 2011). pp. 96-106.

Junjie Yan, Zhiwei Zhang, Zhen Lei, Dong Yi, Stan Z. Li. "Face Liveness Detection by Exploring Multiple Scenic Clues." IEEE International Conference on Control, Automation, Robotics and Vision (ICARCV), 2012.

Dakshina R. Kisku, Massimo Tistarelli, Jamuna Kanta Sing, Phalguni Gupta. "Face Recognition by Fusion of Local and Global Matching Scores using DS Theory: An Evaluation with Uni-classifier and Multi-classifier Paradigm" IEEE Computer Vision and Pattern Recognition Workshops. pp. 60-65. (2009).

Fernando Roberti De Siqueira, William Robson Schwartz, Helio Pedrini. "Adaptive Detection of Human Skin in Color Images." IX Workshop de Visão Computacional (WVC), Rio de Janeiro-RJ, Brazil, pp. 1-6, Jun. 3-5, 2013.

Chutisant Kerdvibulvech. "A methodology for hand and finger motion analysis using adaptive probabilistic models." EURASIP Journal on Embedded Systems 2014, 2014:18.

"Liveness Detection." http://1uapps.com/services/liveness/ (Accessed Jun. 25, 2015). Hoyos Labs Corp.

"CheckEnrol Kiosk." http://www.modi-gmbh.de/en/product-detail/produkt-xyz (Accessed Jun. 25, 2015). MODI Modular Digits GmbH.

* cited by examiner

APPARATUSES, SYSTEMS, AND METHODS FOR CONFIRMING IDENTITY

CROSS-REFERENCE TO RELATED APPLICATIONS

The present application claims priority to U.S. patent application Ser. No. 14/751,014, filed Jun. 25, 2015, which is incorporated herein in its entirety and is currently pending.

FIELD OF THE INVENTION

The present invention is concerned with identifying an individual from one or more images of that individual. Embodiments of the invention identify an individual as a live individual depicted in one or more images.

BACKGROUND OF THE INVENTION

Computerized recognition of a person from an image of that person's face has been thought to be beneficial for a variety of biometric security functions. A number of attempts have been made to recognize a person by his or her facial features, including scanning a face in the infrared spectrum and attempting to identify repetitive movements of the face during the scan, infrared scanning and matching of a face with a photograph, nearest-neighbor matching, Eigen-face matching, and Bayesian face recognition.

Different biometric traits have been used in commercial biometric-related products, including face, fingerprints and iris, with a variety of biometric recognition approaches proposed using one or more biometric traits, including Principal Component Analysis, Linear Discriminant Analysis, Local Binary Patterns and fusion techniques at the image, feature or score level.

In face recognition, the conventional approaches are typically evaluated in still face images captured under controlled conditions. However, those approaches do not work well when using still images and videos captured under unconstrained conditions.

Identifying a person using his or her image, while shown in popular culture, has not yet received general acceptance, possibly because it is unreliable. Thus there is a need for systems, apparatuses, and methods of identifying a person from the person's image and for confirming that a person is the live person.

SUMMARY OF THE INVENTION

Embodiments of apparatuses, systems, and methods for confirming identity are directed to confirming the identity or liveness of a person or to permitting access to a person approved for such access.

Embodiments of the present apparatuses, systems, and methods for confirming identity may use a variety of image processing and subject liveness strategies to improve performance of a system that seeks to identify a person or determine the liveness of that person through one or more images.

In accordance with one embodiment of image identification, a live human detection system includes a camera for capturing a plurality of current images of a human subject, a data storage device for storing data created from at least a portion of each of the plurality of images of the human subject, the portion of each of the plurality of images including features of at least one eye of the human subject, a subject identification device and a processor. In that embodiment, the processor includes instructions which, when executed by the processor, cause the processor to: receive a subject identification from the subject identification device; capture a plurality of current images from the camera, those images including at least one initial image, at least one intermediate image, and at least one later image, where at least one of the plurality of current images can be both an initial image and an intermediate image and at least one other of the plurality of current images can be both an intermediate image and a later image; convert each of the plurality of current images received from the camera to greyscale if the plurality of current images are in color; detect at least one of the eyes of the subject in each of the plurality of current images; determine whether an ocular region including the at least one eye in the at least one initial image matches a corresponding open eye in at least one of the stored images of the subject; determine whether an ocular region including the at least one eye in at least one intermediate image matches a corresponding closed eye in at least one of the stored images of the subject; determine whether an ocular region including the at least one eye in at least one later image matches the corresponding open eye in at least one of the stored images of the subject; and conclude that the subject is live and an approved subject if the ocular region including the at least one eye in the at least one initial image matches the corresponding open eye in at least one of the stored images of the subject, the ocular region including the at least one eye in at least one intermediate image matches a corresponding closed eye in at least one of the stored images of the subject, and ocular region including the at least one eye in at least one later image matches the corresponding open eye in at least one of the stored images of the subject.

In accordance with one embodiment of image identification, a method of live human detection includes: receiving a subject identification from the subject identification device; capturing a plurality of current images from a camera, those images including at least one initial image, at least one intermediate image, and at least one later image, where at least one of the plurality of current images can be both an initial image and an intermediate image and at least one other of the plurality of current images can be both an intermediate image and a later image; converting each of the plurality of current images received from the camera to greyscale if the plurality of current images are in color; detecting at least one of the eyes of the subject in each of the plurality of current images; determining whether the at least one eye in an initial image matches a corresponding open eye in a stored image of the subject; determining whether the at least one eye in an intermediate image matches a corresponding closed eye in a stored image of the subject; determining whether the at least one eye in a later image matches the corresponding open eye in the stored image of the subject; and concluding that the subject is live and an approved subject if the at least one eye in the initial image matches the corresponding open eye in the stored image of the subject, the at least one eye in the intermediate image matches the corresponding closed eye in the stored image of the subject, and the at least one eye in the later image matches the corresponding open eye in the stored image of the subject.

Accordingly, the present invention provides solutions to the shortcomings of prior apparatuses, systems, and methods for confirming identity or liveness of a subject. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of image authentication devices, methods, systems, and networks.

DETAILED DESCRIPTION OF THE INVENTION

Reference will now be made to embodiments of apparatuses, systems, and methods for confirming identity, examples of which are illustrated in the accompanying drawings. Details, features, and advantages of those apparatuses, systems, and methods for confirming identity will become further apparent in the following detailed description of embodiments thereof. It is to be understood that the figures and descriptions included herein illustrate and describe elements that are of particular relevance to apparatuses, systems, and methods for confirming identity, while eliminating, for purposes of clarity, other elements found in typical computerized access systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
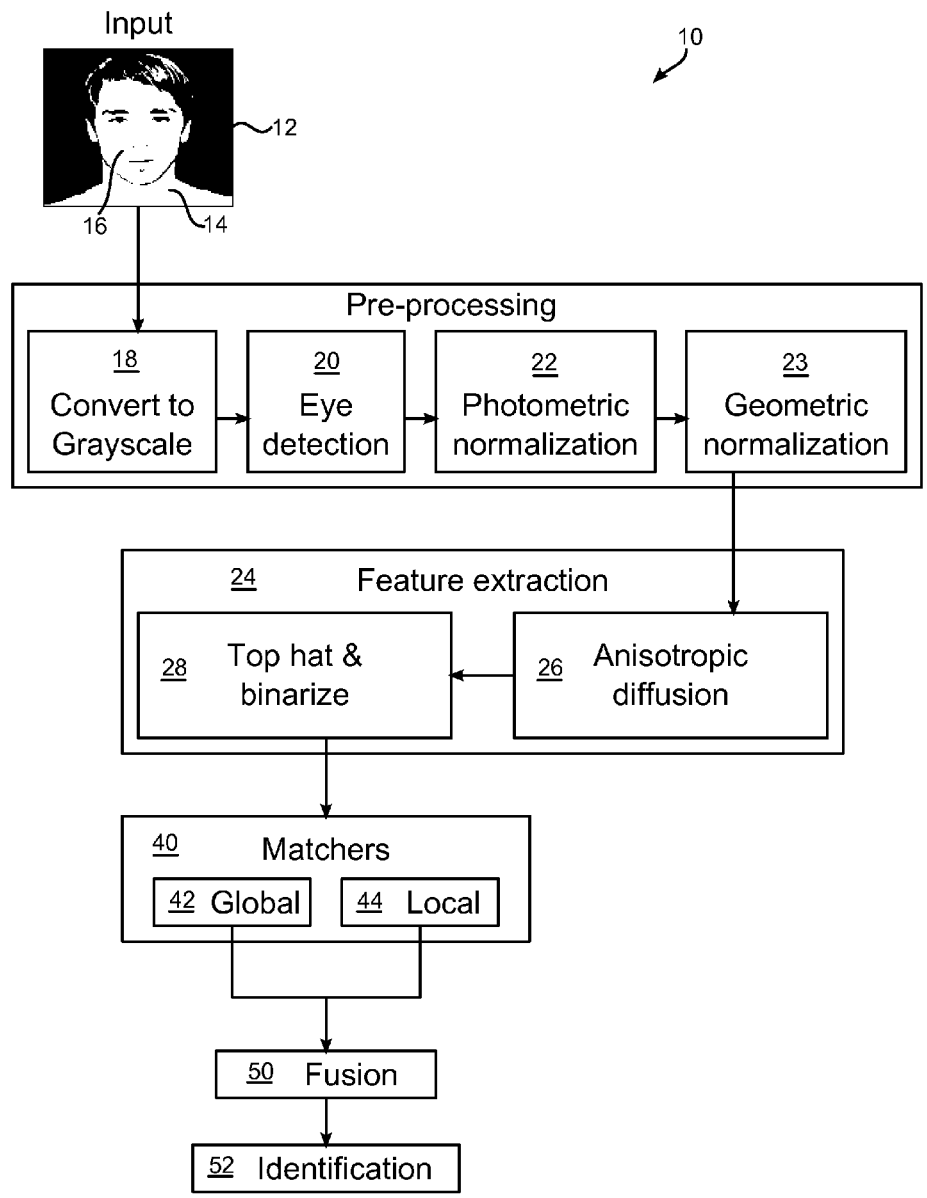
FIG. 1 illustrates an embodiment of an identity confirmation system and process.

FIG. 1 illustrates an embodiment of an authentication system and process 10 that includes identifying facial features from one or more images 12. An image may be a photograph or a frame of a video or other image. Where the image is analog, it may be digitized or converted to digital form for further processing. The image 12 may furthermore include a human subject 14.

Figure 5:
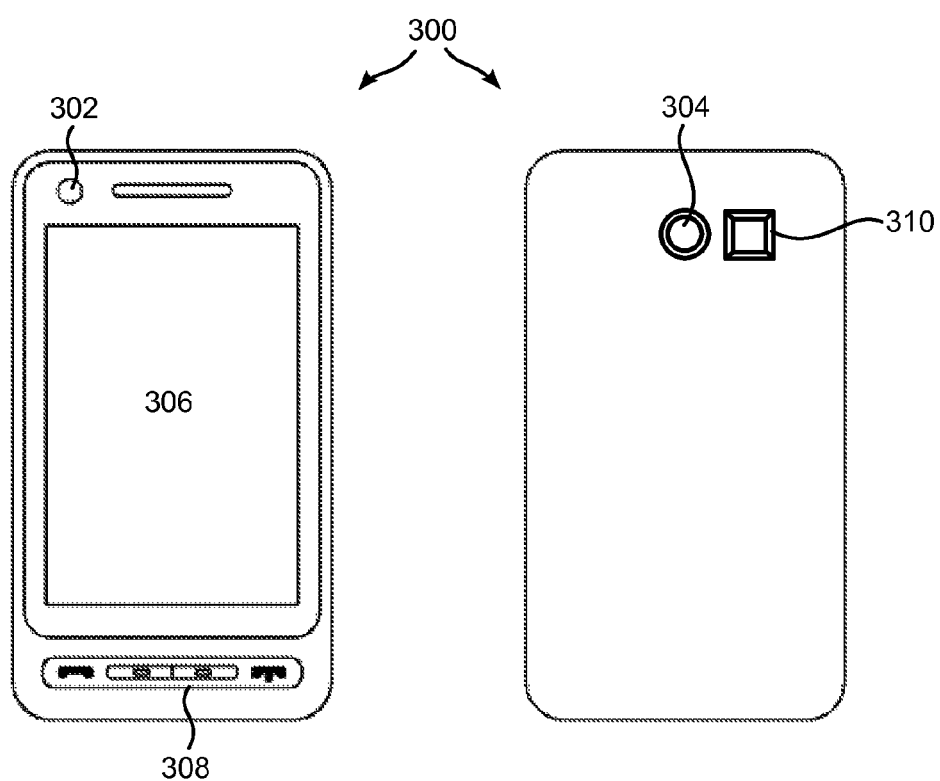
FIG. 5 illustrates an embodiment of a mobile device for use in identity confirmation and subject liveness.
Figure 6:
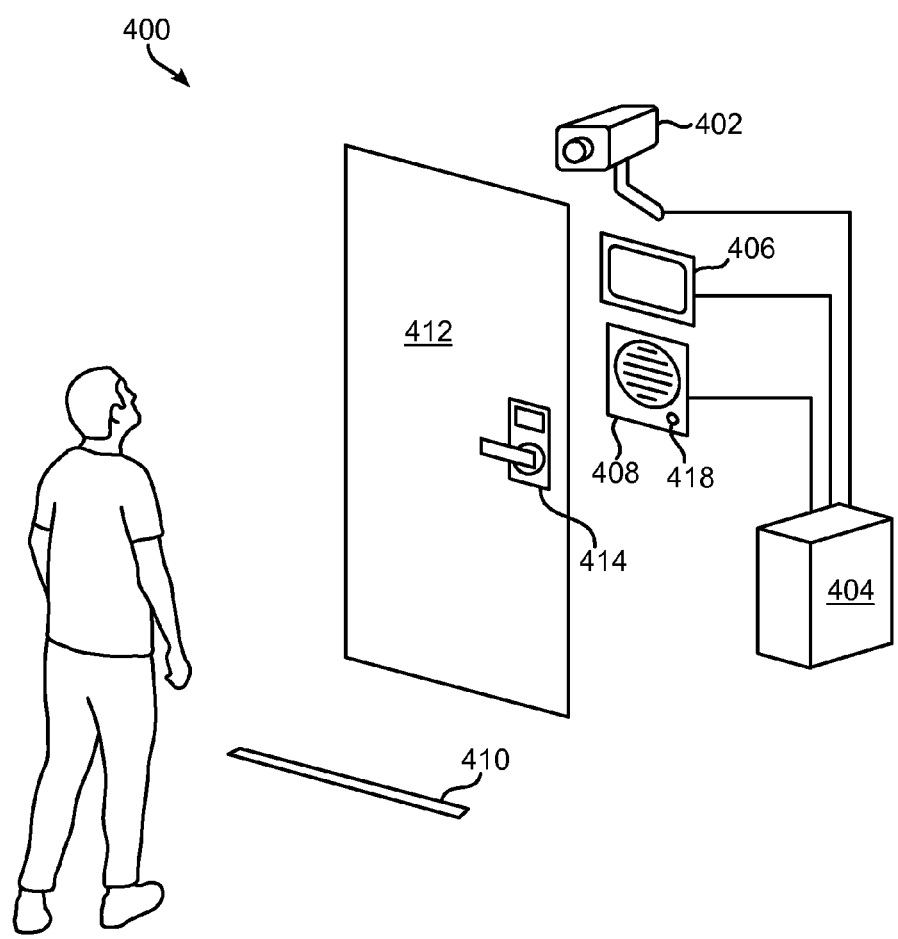
FIG. 6 illustrates an embodiment of an identity confirmation and subject liveness system.
Figure 7:
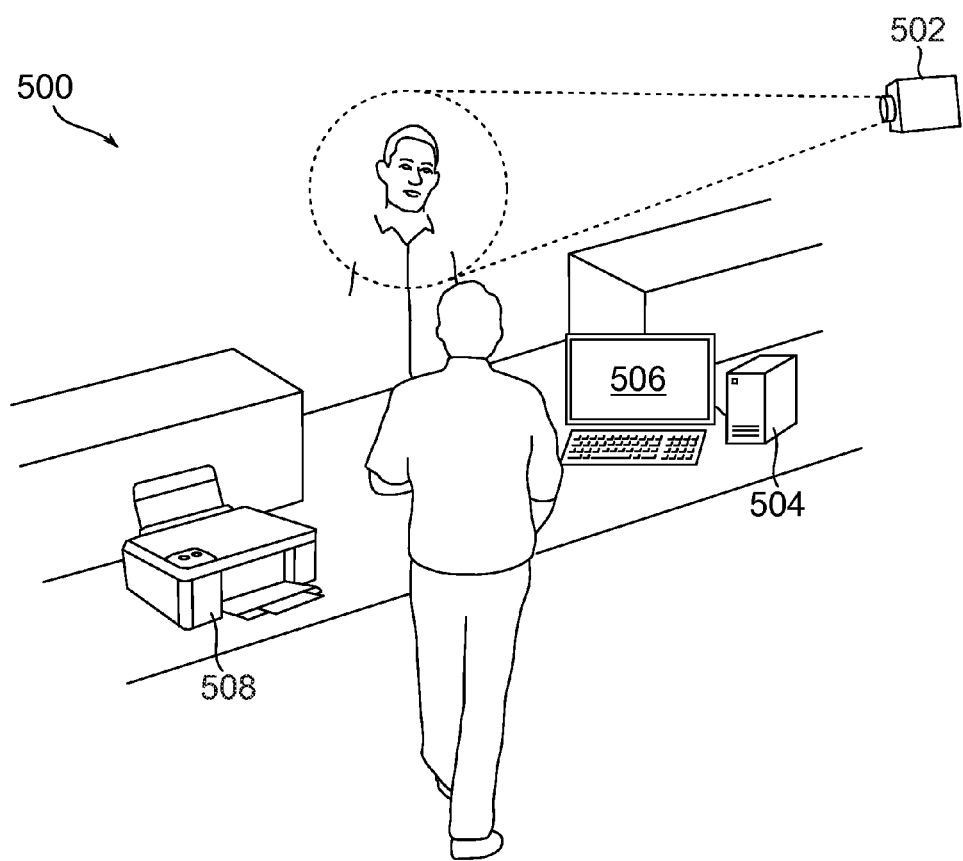
FIG. 7 illustrates another embodiment of an identity confirmation and subject liveness system.

In that embodiment, a sensor, such as sensors 302, 304, 402, and 502 illustrated in FIGS. 5-7, and which may be a type of camera, captures one or more images 12 when actuated. The one or more images may be taken in visible light or infrared light. An image 12 may furthermore include as a portion of that image or all of that image an image of a face 16. The image 12 or portion of the image 12 that includes the face 16 may be transmitted to and received by a processor, such as processor 950 illustrated in FIG. 8, for processing.

It should be noted that the system and method 10 described herein may include processing the image 12, which includes a human subject 14 and face 16, in (depending on the embodiment) multiple ways (e.g., at 18, 20, 22, 23, 24 (including 26 and 28), 40 (including 42 and 44), 50, and 52) and each processing step may change the image. Thus, each form of processing may operate on a version of the image 12 that was subject to one or more previous steps of processing. However, for simplicity, we continue to refer to the image by 12 (including 14 and 16), recognizing that the image may not be in original form.

If the one or more images 12 are color images or otherwise not in greyscale format, the images 12 may be converted to greyscale by the processor 950 as is illustrated at 18.

Detection of eyes or the ocular region, which may be referred to herein as eye detection, in one or more images 12 may be performed by the processor 950 as shown at 20 to determine where the eyes are in the image 12 and, possibly, to determine the location of the face 16 in the image 12 by scaling from the eyes to a normalized face image size. That face image may be a canonical face and that face image may be scaled to a standardized size.

At 22, the processor 950 may photometrically normalize on the face 16 for illumination invariance, for example, to eliminate the effects of illumination variations, such as local shadowing and highlights, while still preserving the essential elements of visual appearance for more efficient face recognition. Photometric normalization 22 of the face 16 may precede or follow geometric normalization 23 of the face 16. A technique, such as histogram equalization, can be performed, for example, by dividing the face 16 in the image 12 into a left side and a right side and a distribution of pixel intensity can be determined for the left side of the face 16, which may be referred to as the left tile, and for the right side of the face, which may be referred to as the right tile. The histogram equalization may be of the contrast-limited adaptive type, to normalize the pixel intensity distribution in each portion of the image 12. Histogram equalization may also be performed on the whole face 16 in the image 12. The equalized whole face image may then be combined with the equalized left side and ride side of the face to alleviate illumination variance that may exist during acquisition, for example, because of different environmental conditions existing at the time of acquisition.

At 23, the processor 950 may geometrically normalize the face 16 found in the image 12. Geometric normalization 23 of the face 16 may follow detecting the eyes 20 in the face 16. Each eye may be placed in a fixed position by enlarging or reducing the image 12 or face 16 or by rotating, translating, or scaling the image 12 or face 16, or moving the face 16 left, right, up or down to the extent necessary to place the eyes in the predetermined positions. The image resulting from such geometrical normalization 23 of the image 12 or face 16 may be referred to as a geometrically normalized face image.

For example, geometrically normalizing the face 16 may include moving the face 16 until one of the left eye and the right eye is in a first predetermined position in an image field. Scaling the face 16 may include expanding or contracting the face around the first predetermined location until the second of the left eye and the right eye is in a second predetermined location. It should be recognized that the first predetermined position may be a predetermined pixel at which the first eye is centered and the second predetermined location may be on a vertical line of pixels or within a range of pixels.

Features may then be identified or extracted from the geometrically and photometrically normalized face image 16 at 24. Feature extraction may yield edges that form lines or other shaped groupings of pixels based on the subject of the photograph's physiology and the contours and geometric shape of the subject's face. Feature extraction may include anisotropic diffusion 26, which may reduce noise in the image 12 and face 16 while preserving facial content and without removing significant parts of the face image content, typically face edges, lines or other facial features that are important for the interpretation of the face image 16. Feature extraction may produce a family of parameterized images where each resulting image is a combination between the original image and a filter that depends on the local content of the original image. The images resulting from anisotropic diffusion 26 may include a convolution between the original image 12 and a two-dimensional isotropic Gaussian filter, where the width of the filter increases with the parameter. This diffusion process may thus be a linear and space-invariant transformation of the original image.

The application of anisotropic diffusion 26 may include convolution of the original image 12 with a Gaussian filter that increases in width. Facial content may furthermore include facial features such as the nose, eyes, and mouth.

Image noise may include spurious and extraneous information in an image such as the geometrically normalized 22 image 12 that likely did not exist in the subject imaged. For example, one type of image noise may be the variation of brightness or color information in an image 12 and may include what is sometimes referred to as electronic noise in an image.

Image noise may be removed, for example, by removing pixel segments having less than a predetermined number of contiguous pixels, such as a number in the range of 10 to 25 contiguous pixels, with the understanding that such small segments may not be features of the subject's face, but may be considered image noise.

Top hat segmentation 28 may be performed on an image 12 such as the geometrically normalized 22 image 12 in certain embodiments, after anisotropic diffusion 26 has been performed, to further extract features from the image 12. Top hat segmentation 28 may be used to extract small elements and details from the extracted features. For example, a feature extracted using anisotropic diffusion 26 may be further extracted using top hat segmentation 28.

The original image 12 may be subtracted from the anisotropically diffused image 12 by subtracting the pixel intensity values of the original diffused image 12 from corresponding pixel intensity values of the opened image 12. The result of that may be used to segment and extract features from the top hat transformed image.

The top hat segments may also be binarized, for example, to make the segments white or 1-valued pixels and the non-segment portions of the top hat segmented image black or 0-valued pixels.

When binarizing 28 the image 12, the pixels may initially be viewed on an intensity scale, each pixel, for example, having an intensity on a scale of 0-255. A threshold may then be selected so that pixels having an intensity below the threshold are assigned zeros, which may be visualized as black, and pixels having an intensity above the threshold are assigned ones, which may be visualized as white, in one embodiment and vice versa in another.

The threshold used during binarization may be set at various levels. The threshold may be set low, for example at 85 on a scale of 0-255, so that more features that exhibit visual light intensity may be recognized as light pixels and, for example, assigned one values, than would be recognized as light pixels if the threshold were set higher. Alternately the threshold may be set near mid-range, such as at 128 or it may be set high in the range, such as around 170 to reduce the number of pixels recognized as light and, thereby, reduce artificial or non-feature carrying pixels or segments made up of contiguous pixels. Any intensity range may be used as a threshold, including, for example, a threshold set from 75 to 180.

In a binarized image 12, pixels may be viewed as white and black. White top hat segmented images 12 may be obtained using an anisotropically diffused image 12. The anisotropic diffusion of the image 12 may reduce noise in the image without blurring edges of features found in the image 12. Then, the image 12 may be opened by dilation of the original image 12 followed by erosion of the result. The top hat transformation may be equal to the difference between the intensity of pixels in the image being processed and the result of the open function.

Image noise may include spurious and extraneous information in an image or processed image, such as the top hat and binarized image 28. Image noise may be removed, for example, by removing pixel segments having less than a predetermined number of pixels, such as a number in the range of 10 to 50, of contiguous pixels with the understanding that such small segments may not be features of the subject's face.

Segments of contiguous pixels that are smaller than a predetermined threshold (number) of pixels may be removed from the image 12. Segment removal may be used to discard minor features that may not be consistently detected and noise and to ensure that only prominent and consistent segmented features are extracted and matched between sample images of an individual subject. That may be done to improve the chance that artificial features and segments, for example those caused by noise or reflections that do not represent features of the subject, are not considered during matching.

A mask, which may be elliptical in shape, may also be applied to the feature segmented image 24 to ensure that features and segments near the outer borders of the image 24, for example features that are not on the face of the subject or that are not face-based, such as the ears or neck of the subject, may not be considered during matching. The elliptical mask may be applied after feature extraction so that artificial segments are not created and extracted through the appearance of an elliptical mask in the greyscale image.

Matching of images 12 at 40 may be performed in a variety of ways. The images 12 to be matched may include a live image of a person currently standing in front of a camera, such as the camera 302 or 304 of a mobile device 300 or camera 402, 502, and 902 described herein, an image of that person placed in front of the camera 302, 304, 402, 502, or 902 and a stored image of that person. In certain embodiments, all three of those images 12 will be matched to assure, for example, that a live person requesting access is the same person in an image provided by that person at the time of access request and a stored image of the same person. One or more of those three images 12 may be (or may have been) subject to processing according to one or more of the processes described above and herein.

The image 12 of the subject that is provided by that person at the time access is requested, where a still image is required for access, may for example, be a photograph of the person requesting access found in a government issued identification document that is held up by the live person near the face of that person for reimaging by the camera 302, 304, 402, 502, 902. Alternately, the still image 12 may be an image of a still image of the subject taken separately from the image 12 of the live person. Then, a match between the live person image or images being taken currently, the photographic image concurrently provided by the live person, and an image of a person stored in or accessible to the confirmation system 10, may be made. If all three of those images are determined to be of the same person, and that person is a person who is permitted access, for example, to a software program that may be run on the mobile device 300, a room or compartment through a door 412, drawer, or other physical object, as illustrated in FIG. 6, or a financial system, as illustrated in FIG. 7, then the requestor is permitted access, as requested.

Thus, in an embodiment wherein three images 12 are compared to confirm the identity of the subject, the subject holds a photograph of the subject near or next to the face of the subject while an image 12 is taken of both the live subject and the photograph. Then, before confirmation that the live subject is approved for access by comparison of the live subject to one or more stored gallery images 12, the image authentication system 10 confirms that the live subject is the same subject depicted in the photograph. Thus, the image authentication system 10 may further capture an image 12 of a photograph of the subject in the same image frame in which the live subject image 12 is captured using the mobile device 300 camera 302 or 304 or camera 402 or 502. The image authentication system 10 may also cause the processor 950 (as described herein, such as with respect to FIG. 8) to separate the image of the photograph of the subject from the image of the live subject, convert the photographic image to greyscale if that image is in color, detect the eyes or ocular area of the subject in the photographic image, fix at least one of the left eye or ocular area and the right eye or ocular area in a predetermined position in a photographic image field, scale a face in the photographic image to a standard size based on the location of the eyes or ocular area in the photographic image 12, equalize lighting on a left side of the face and a right side of the face in the photographic image, binarize the photographic image, group contiguous pixels in the binarized photographic image into segments, identify features of the face in the photographic image, remove segments having fewer than a predetermined number of contiguous pixels from the features of the face in the photographic image, mask the photographic image to remove segments around the face, including ears and neck of the subject, compare the live image to the photographic image, and determine whether the live image and the photographic image display the face of the same person.

Matching may be performed in the image authentication system and method 10 by one or more matching systems. A first matching system may be referred to as a global matcher 42 and a second matching system may be referred to as a local matcher 44.

In an embodiment of global matching 42, features that have been extracted, for example, using feature extraction 24, from a first image 12 are compared to features extracted from a second image 12. A score, which may be a ratio of matching pixels to total pixels may be determined that indicates the level of any match found between the first image 12 and the second image 12. This score or ratio measures the overlap of extracted segments between the subject image 12 and a reference image 12. The score or ratio of the two feature segmented images 12 may be computed through convolution. In convolution, the probe image may be slid pixel by pixel across the gallery image in a top to bottom and left to right fashion, comparing the two images 12 at each relative position or in the vicinity of that position, thereby making a pixel by pixel match between the images 12.

To account for the small differences that exist in the segmented features from different samples of the same subject, a predetermined window, such as a 5×5 pixel window, may be formed around a white pixel for template matching pixels that are not in precisely the same location. Thus, for example, if for a white pixel in the probe segmented image, there is another white pixel in the 5×5 neighborhood of the corresponding position on the gallery segmented image 12, then the pixels may be said to be matched. Other sized predetermined windows may alternately be used, such as, for example, anywhere in the range of a 2×2 to a 15×15 pixel window.

In an embodiment of local matching 44, fiducial or reference points in images 12 may be compared. For example, an end of a feature segment in a live image 12 provided by the camera 302, 304, 402, 502 and from which features have been extracted at 24 can be compared to a stored reference image 12 from which features have been extracted to determine whether a similar segment exists in the reference image 12 and whether that segment ends in a similar location.

Another example of a fiducial or reference point that can be compared in features extracted from two images 12 is a point where a segment branch occurs in a first image 12, a still image 12 presented to the camera 302, 304, 402, 502, 902, for example, which can be compared to a second image 12, the reference image or live image, for example, to determine whether a segment branch occurs in or near the same location on the second image. Thus, segments that contact or intersect other segments may be given more weight in local matching than segments that do not contact or intersect other segments. Alternatively, segments that contact or intersect other segments may be the only segments considered in local matching because ridge segments with one or more branching segments may be effective to determine whether a local match exists.

To make the local matching algorithm efficient, fiducial points can be removed post-processing. To define under which conditions fiducial points that may be false or otherwise not helpful are to be removed, a variable D, which represents the average inter-segment width or the average distance between two parallel neighboring segments, may be introduced. Four conditions that can be checked in fiducial point removal include: (1) if the distance between one branch point and one end point is less than a predetermined distance D and the two points are located in the same segment, remove both points; (2) if the distance between two branch points is less than the predetermined distance D and they are in the same ridge, remove both branch points; (3) if two end points are within the predetermined distance D and their directions are coincident with a small angle variation, and no other termination is located between the two endpoints, then the two endpoints can be regarded as false fiducial points derived from a broken segment and removed;

and (4) if two end points are located in a short ridge with a length less than the predetermined distance D, the two end points can be removed.

Fiducial points that are closer to one another than a predetermined number of pixels may be eliminated to reduce the computational complexity of the matching step. The fiducial point filtering may, for example, be done based on the correspondence of points being no more than 5 to 15, in the following example 10, pixels apart. In such an embodiment, any points extracted from the same segmented features fewer than 10 pixels apart may be removed, for example beginning with second point in the set or template. The local matcher 150 may also compare the fiducial points in feature extractions from one image 12 to another, after undesired points are eliminated, where such point elimination is used, to determine a number of points that match and a number of points that do not match in those two images 12.

A similar location may be defined as within a predetermined number of pixels, for example 5-15, from the location found in another image 12.

The global matching result and the local matching result can be normalized so that those results are on the same or comparable scales, for example a 0-1 scale. A fused score may then be determined at 50 based on the normalized results of both global matching and local matching.

The score may be created for one or more of i) comparison of an image 12 taken of a live subject and a still image 12 identification photograph of that person that is provided by the live subject; ii) comparison of an image 12 taken of a live subject and a gallery image 12 stored in a database in the data storage device 962; and iii) comparison of the still image 12 identification photograph of that person that is provided by the live subject and a gallery image 12 stored in the database in the data storage device 962. A matching decision may then be made at 52 based on those one or more scores.

In the event that an image 12 is imperfect, the image 12 may be subjected to photometric normalization, image denoising, or image deblurring. Image denoising may remove image noise or suppress visual artifacts and image deblurring may remove image blur when the image captured is small or affected by camera motion blur. Photometric normalization, image denoising, or image deblurring may be performed by the processor 950 or by a networked device to correct illumination variation or other image noise issues and provide a resulting image that may be improved and may be utilized for comparison and matching.

To capture better quality images using the camera 302, 304, 402, 502, a high frame rate may be selected, image stabilization may be employed, or image filters, motion stabilizers, or one or more other features built into the camera 302, 304, 402, 502 may be employed by the processor 950 or another device or person.

When an image 12 of a live subject is to be captured, whether the image 12 is a video or one or more still images, a shape may appear on the view finder of the camera 302, 304, 402, 502, 902, which may be the screen 306 of a mobile device 300 or screen 506, and the subject may place his or her face or a desired portion of his or her head, head and shoulders, or any desired portion of his or her person in the shape. The subject may attempt to fill the shape with a desired portion of his or her person to standardize the photograph or to ensure capture of the necessary portion of the subject at a desired image size. Instructions may also or alternately be provided on the screen 306 to assist in image capture.

The shape appearing on the view finder can be any desired shape including a circle, an oval, or a rectangle.

A standard distance for the subject to be placed from the camera 302, 304, 402, 502, 902 may be established and may be communicated to the subject. For example, where a fixed camera is used, such as the camera 402 illustrated in FIG. 6, a line 410 may be placed on the floor at a desired space from the camera 402 and the subject may stand with her or his toes touching the line 410 or a short distance behind the line 410 when the image is captured. Where a mobile device 300 is used, the mobile device 300 may be held at arms-length from the subject when the image 12 is captured.

Figure 2:
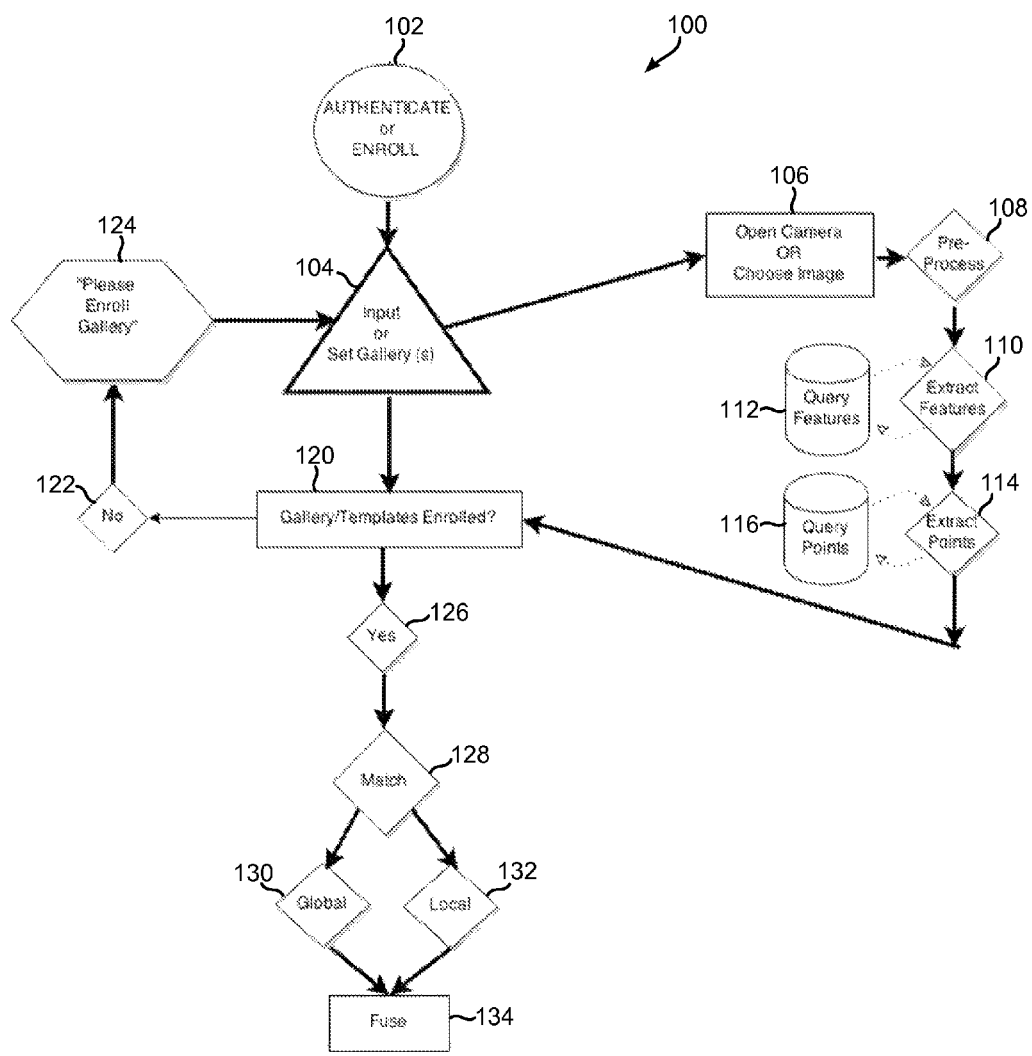
FIG. 2 illustrates an embodiment of a method of providing access based on identity confirmation.

FIG. 2 illustrates an embodiment of a process and system for enrolling and authenticating a subject 100 in an image authentication system, such as the image authentication system 10, for example. At 102, a subject may select whether they wish to enroll in the image authentication system or be authenticated by the image authentication system. That selection may be performed in various ways including, for example, by selecting one of two or more facilities presented on a computer or mobile device screen using, for example, touch screen, a mouse device, or a keyboard.

In one embodiment, this image identification enrollment process 100 may be open to any subject, while in another embodiment, this image identification system enrollment 100 may only be open to one or more pre-registered subjects. In additionally, this image identification system enrollment may be for a new registration system, while in another embodiment, this image identification system may be a new component of any existing registration system.

At 104, the process 100 for enrolling and authenticating a subject in an image authentication system will permit one or more gallery images (e.g., images 12 as described above) to be input into the system 100 and, when an appropriate number of gallery images of an acceptable quality have been input, the system 100 will permit the gallery to be set. A subject or user may be provided with a choice of creating a gallery or authenticating the subject against a previously input gallery by the system 100 and may select whether to input images or to select that subject's gallery. The process for enrolling and authenticating a subject in an image authentication system 100 may require a predetermined number of images be input in a gallery for any subject and may require that the images input are of a good enough quality to be matched to the subject when that subject requests authentication, for example, to access a program, application, or location.

At 106, when a selection is made to create a gallery at 104, the subject may be instructed by the system 100, for example using text displayed on a computer monitor or mobile device 300 screen 306, or computer generated audio or voice instructions, for image capture. For example, the subject may be instructed to stand in a predetermined location, to look at the camera 302, 304, 402, 502, which may, for example, be mounted or may be in a mobile device 300 held by the subject, and the subject may be instructed to actuate an image capture initiation button when the image is ready to be captured. The system may process a captured image at 106, determining whether the image is of a quality from which the subject can be identified, and then display the image to the subject. The subject may then choose to add the image to the subject's gallery in the system 100 or may reject the image and have the image retaken.

At 108, preprocessing of the image takes place. Such preprocessing may include, for example, as described above with respect to the authentication system and method 10 of FIG. 1, conversion of the image to greyscale 18, eye detection 20, and geometric normalization 22. Features are extracted at 110 (e.g., as described with respect to method 10 at 24) and the extracted features may be stored in a storage device 112 for future reference. Points are extracted at 114 (e.g., as described with respect to method 10) and may be stored in a storage device 116 for future reference.

At 120, a determination is made as to whether the subject has a gallery of images of himself or herself enrolled in the system 100. If the subject does not have a gallery enrolled in the system 100, the subject is requested to enroll a gallery at 124. If the subject does not have a gallery enrolled in the system 100, the subject may be returned to 104 for enrollment.

If the subject does have a gallery enrolled at 120, then one or more images of the subject may be captured at 128 and a determination of whether the subject image matches one or more gallery images of the subject may be performed. That matching may include global matching 130, local matching 132 and fusion 134, which may operate similar to that described in connection with global matching 42, local matching 44, and fusion 50 discussed elsewhere herein.

Figure 3:
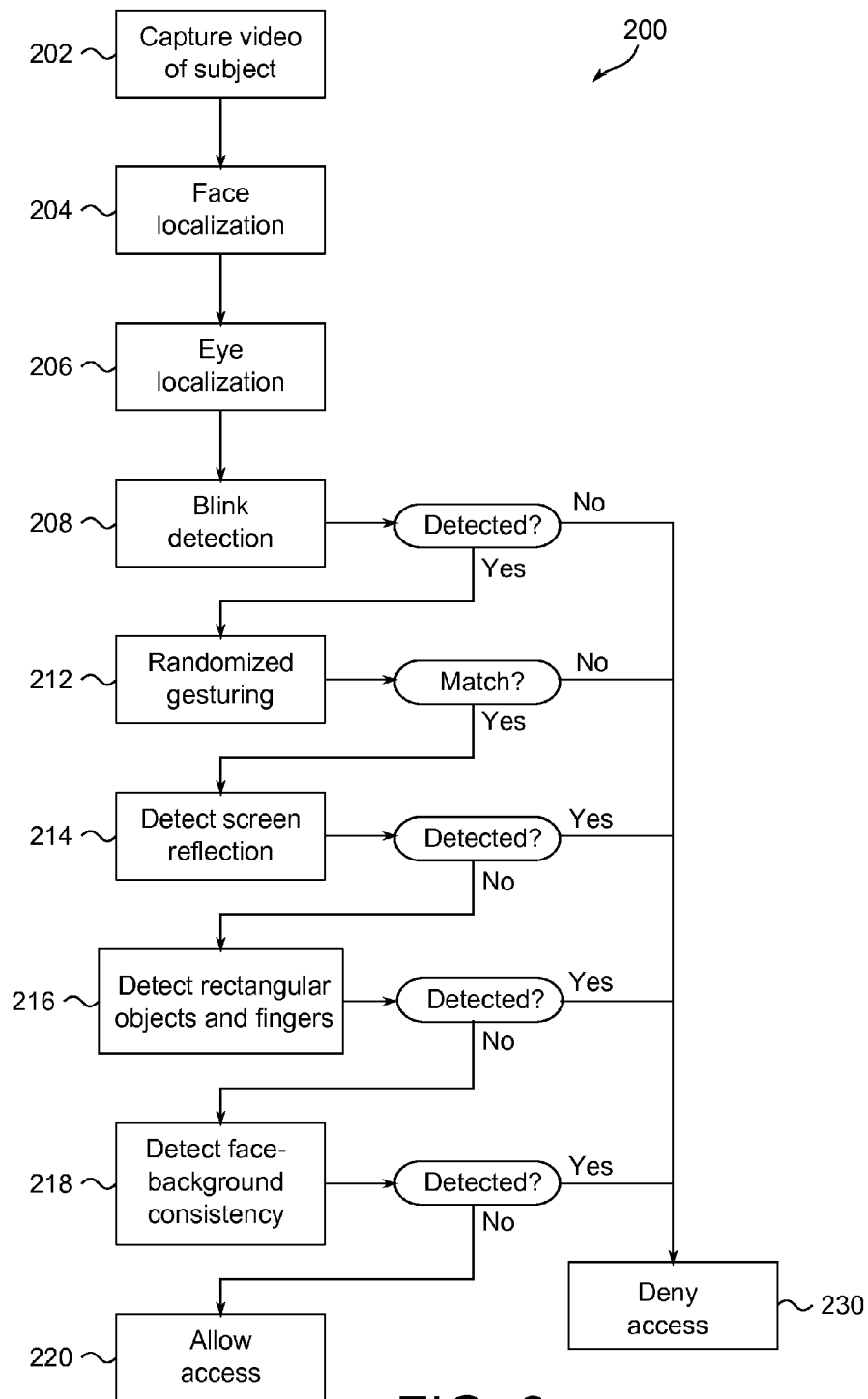
FIG. 3 illustrates an embodiment of a method of determining liveness of a subject.

FIG. 3 illustrates an embodiment of a liveness detection process 200. That process 200 may include capture of a video of the subject at 202. In one or more frames of that video, which may be images 12 as described herein, the face of the subject may be localized at 204 and the eyes of the subject may be localized at 206 as described herein.

Face localization 204 may detect the face of a subject in a captured image 12. Such face localization 204 may be performed using, for example, an LBP-cascade frontal face function. Face localization 204 may use a system, such as the OpenCV detectMultiScale function, to detect a human face within the field of view of the camera 302, 304, 402, 502, 902 or in an image 12 taken by the camera 302, 304, 402, 502, 902. Face detection from a video feed or still image 12 may divide an image into different size objects and select an object as likely being face based from its size or another quality in one or more frames of video or images. The portion of the image 12 containing the object likely to be or contain a face or portion of a face may be referred to as a face sub-image. A rectangle or other shape may then be placed around the face sub-image to provide a boundary for that object.

Eye localization 206 may begin by determining where in an image, which may be a bounded image found using face localization 204, the eyes or ocular region are located. Eye localization 206 may be performed using Haar-cascading, for example using the OpenCV Haar-cascading function. Eye localization 206 may return two bounded images, which may be referred to as a right eye sub-image and a left eye sub-image. The eye sub-images may, for example, be rectangular sections of the face sub-image that are each likely to contain an eye. The face sub-image may then be shifted or scaled, by expanding it or contracting it, for example, until the bounded eye sub-image portions of the face sub-image are placed in predetermined locations. For example, the face sub-image may be shifted until the right eye sub-image is centered on a pixel that is a predetermined number of pixels from the left side of the image and a predetermined number of pixels from the top of the image. Next, the image may be expanded and contracted around the center pixel used for the right eye sub-image until the left eye sub-image is a predetermined number of pixels from the right side of the image.

At 208, an eye-blinking strategy may be used to confirm the identity or liveness of the subject of the image 12. Such an eye-blinking strategy 208 may include comparing one or more of the eyes in at least two different images 12.

Eye blinking or closing may be an element used to determine that a subject being photographed or of which a video is or has recently been taken is the actual, live subject and not an image of the subject.

Figure 4:
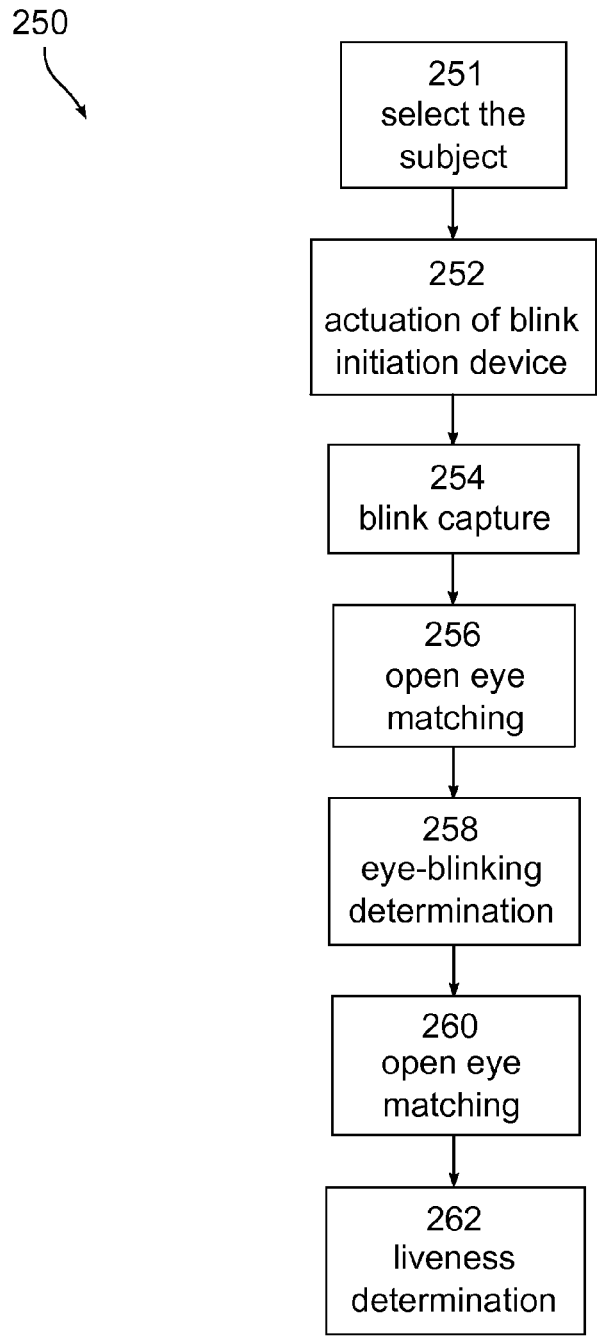
FIG. 4 illustrates an embodiment of a blink detection method.

An embodiment of an eye blinking detection method 250 is illustrated in FIG. 4. That embodiment may include a subject selecting herself or his self from a display 306, 406, 506 of one or more subjects approved for access 251. Alternatively, another person may select the subject 251 to be confirmed from the display 306, 406, 506. The display 306, 406, 506 may display a picture of the subject, the name of the subject, or another indicator from which the subject may be identified and the subject or other person may select the desired subject 251 by touching a touch screen display where the desired subject is indicated, or from a keyboard or mouse by, for example, moving a cursor on the display 306, 406, 506 until the desired subject is highlighted and then selecting an enter button or clicking the mouse to select the desired subject.

The subject or another person may then actuate a blink-initiation device 252, such as, for example, a picture of a button on a mobile device 300 screen 306 or a physical button coupled by wire or wirelessly to an image acquisition device, such as a computing device 300, 404, 504, 910 or camera 302, 304, 402, 502, 902. After or around the time that the blink-initiation device is actuated, the subject may blink or close and then reopen their eyes. The image authentication system may then capture one or more images 12 of the person blinking 254, which may be frames of video, of the subject recognizing that at least the first image captured should capture the subject with her or his eyes open, at least one subsequent intermediate image should capture the subject with his or her eyes closed, and at least the last of the later images captured should capture the subject with her or his eyes open. Those images may each be considered image 12 as illustrated in FIG. 1 and may be processed as discussed in connection with FIG. 1. For example, one or more of those images 12 may be converted to greyscale 18, eyes or ocular regions may be detected 20 in the image 12, photometric normalization 22 may be performed on the image 12, geometric normalization 23 may be performed on the image 12, anisotropic diffusion 26 may be performed on the image 12, or top hat and binarization 28 may be performed on the image 12.

Alternatively, the selection of the desired subject may initiate capture of the images 12, immediately or after a time delay of a predetermined amount of time.

The blink detection method 250 may furthermore provide a countdown to the time when the blink detection system will capture the blinking images. Such countdown may be an audible count, for example with a "three, two, one, blink" emanating from the mobile device 300, the speaker 408, or another device; displayed on a display 306, 406, or 506; or presented otherwise as desired.

After one or more eyes are detected in an image 12, various portions of the image 12 may be processed as described in connection with FIGS. 1, 3, and 4. For example, once one or more images are determined to have one or both eyes in the desired open or closed state, only the facial portion of those images 12 may be processed or only one or both eye portions of those images 12 may be processed.

An eye-blinking determination function 258 of eye blinking detection 208 may determine whether an initial image is of the person claiming to be the subject with one or both eyes open, whether one or more of the intermediate images 12 is an image 12 of the subject with one or more eyes closed, and whether a later image is an image of the subject with one or more eyes open. For example, a template based matching function may correlate an image 12 of the subject, such as a stored image 12 of the subject known to be an image in which the subject has her or his eyes closed, with an intermediate image 12 taken after the blink initiation device is actuated. In particular, one or both of the eye sub-images from the two images (the live intermediate image 12 and the stored image 12, for example) may be compared and if the correlation is high, then the processor 950 executing the eye blinking determination function 258 may determine that one or both eyes in the live image 12 are, in actuality, closed due to a high level of correlation. If the correlation between the two images is low, because, for example, the coloring, brightness, or other feature of the images, particularly in the eye sub-images, is different, then a determination may be made that the eyes in the live image 12 are closed.

In an embodiment, the subject presenting herself or his self is selected at 251 and a plurality of images 12 from a video feed are captured and processed at 252. The number of frames may be predetermined and image 12 capture may continue until the desired number of images have been captured. For example, the number of frames of images 12 captured may be selected to be in a range of 7 to 12 in one embodiment.

Once one or both eye portions are extracted from each image 12 frame captured, if more than one face or more than two eyes are found in an image, the largest eyes or the eyes from the largest face may be selected as the eyes of the subject to be verified.

At 256, one or both of the eyes in the initial blinking video frames may be correlated with corresponding open eyes in a stored image of the subject. If the features of a first eye from the initial image 12 are determined to match the features from the corresponding open eye in the stored image, then that initial image eye may be determined to be that of the subject and opened. Similarly, if the features of a second eye from the initial image 12 are determined to match the features from the corresponding open eye in the stored image, then that second initial image eye may be determined to be that of the subject and opened.

At 258, one or both of the eyes from one or more intermediate images 12 captured after the initial images from the blinking video frames may be correlated with corresponding closed eyes in a stored image of the subject. If the features of a first eye from the initial image 12 are determined to match the features from the corresponding closed eye in the stored image, then that initial image 12 eye may be determined to be that of the subject and closed. Similarly, if the features of a second eye from the initial image are determined to match the features from the corresponding open eye in the stored image 12, then that second initial image 12 eye may be determined to be that of the subject and closed.

At 260, one or both of the eyes in the later blinking video frames may be correlated with corresponding open eyes in a stored image 12 of the subject as described in connection with 256.

A live determination may be made at 262 based on a desired criterion, such as having both eyes of an initial image 12 frame match both eyes from a stored open eye image of the subject, having both eyes of an intermediate image 12 frame match both eyes from a stored closed eye image of the subject, and having both eyes of a later image 12 frame match both eyes from a stored open eye image of the subject. Alternatively, only one eye may be required to match in any image 12 or only one or two of the images may be matched, such as only the closed eye image 12 or the closed eye image 12 and one of the open eye images 12.

In a ten frame image 12 video capture, for example, the first and second images 12 may be selected for a match determination for open eyes 256, the second through ninth images 12 may be selected for a match determination for closed eyes 258, and the ninth and tenth images 12 may be selected for a match determination for open eyes 260. Thus, an image 12 may be used in both an open eye determination 256 and 260 and a closed eye determination 258. More than one image 12 may furthermore be considered in any or all of 256, 258, and 260 since one image 12 considered may have the desired eye position and may be found to match, while another image 12 considered may not have the desired eye position or may not be found to match. If the eye or eyes of any one of the initial first and second images 12 are found to match the open eye stored image of the subject, the eye or eyes of any one of the intermediate second through ninth images 12 are found to match the closed eye stored image of the subject, and the eye or eyes of any one of the later ninth and tenth images 12 are found to match the open eye stored image of the subject, then it may be concluded that a live subject match has been found.

The correlation may include a predetermined threshold for similarity between the eyes of the images 12 in which a high correlation, one that rises above the threshold, indicates that the eyes in the blinking image 12 are not closed and in which a low correlation, one that is below the threshold, indicates that the eyes in the blinking image are closed at 262.

Many potential causes of low correlation between a stored image 12 of the subject with his or her eyes closed and a live image 12 of the subject exist including, for example, an obstruction, such as a hand, that comes between the subject and the camera 302, 304, 402, 502, which obstructs imaging of one or both eyes.

Referring again to FIG. 3, at 212, movements, activities, or gestures other than eye blinking or eye closing may also or alternately be used to determine whether the person attempting to gain access is live and currently being imaged live, as opposed to the person attempting to gain access not being live in the current imaged, for example, by presenting a photograph of that person to the system 300, 400, or 500. Such movements, activities, or gestures may include, for example, blinking the left eye, blinking the right eye, blinking both eyes, sequentially or simultaneously, moving the head to the right, left, up, down, or a combination of such head movements, moving the lips, holding one or more fingers in front of the camera 302, 304, 402, 502, 902 near the face, moving closer to or farther from the camera 302, 304, 402, 502, 902, applying pressure to the screen 306 of a mobile device 300 with one or more fingers, covering the camera 302, 304, 402, 502, 902, for example with a hand such that the face is not in the field of view of the camera 302, 304, 402, 502, 902, speaking, for example saying a phrase that may be provided by a mobile device 300 by, for example, providing the phrase in writing or audibly, requiring one or more activities, such as connecting a sequence of dots, circles, disks, or other objects, or using one or more fingers to touch locations where dots or other objects appear on the screen, where the appearance of such dots or other objects may be randomized.

When images 12 are taken of a subject moving, acting, or gesturing, functions described herein can be performed, including for example, inclusion of a shape in the viewfinder of the camera 302, 304, 402, 502, 902 or on a monitor 306, 406, or 506 in which the image 12 to be captured is displayed, for positioning of the face or other portion of the body; use of a still photograph held or otherwise placed in the field of view of the camera 302, 304, 402, 502, 902, inclusion of text on a screen, such as the screen 964 of a mobile device 306, face localization, and eye localization.

When sensing or determining when a movement, activity, or gesture has occurred, image authentication may compare two or more images 12. In one embodiment, an image authentication system 910 has images 12 of a subject stored in a storage device 962 showing the subject making a variety of movements, activities or gestures and compares one or more current images 12 to one or more stored images 12 of the subject making the desired gesture or action. The image authentication system 910 may then determine whether two or more images 12 contain the same subject in the same position.

In another embodiment, the image authentication system compares one or more current images 12 to one or more images 12 of the subject not making the movement.

Machine-machine detection may be performed on one or more images 12 or a video of a subject. Machine-machine detection may assist in thwarting an attempt at faking or hacking the liveness required for access in certain embodiments. For example, someone other than the proper subject may attempt to gain access by, for example, playing a video of the subject performing the required action, gesture or movement. To thwart an attempt at access by someone other than the live subject purported to be attempting access, image authentication may attempt to detect screen reflection from a screen 306 being used to display the subject or the subject performing an action, gesture, or movement requested of the subject to show liveness at 214. Other ways of detecting that a machine is being used in an attempt to fool the system into believing the live subject is being imaged when the live subject is not being imaged include, detection of an object having the shape of a mobile device 300 that might be used to display the action, gesture, or movement requested of a subject; detection of fingers surrounding the subject performing the action, gesture, or movement requested of a subject; or background detection at 216.

Apparatuses, systems, and methods for confirming that a subject is appearing live in the images may detect a reflection that might be created by a device screen 306, 406, 506 used to display one or more images or a video of the subject that the image authentication system or process is attempting to confirm is the person requesting access. In one such embodiment, image detection may compare movement of the presented subject in two or more images 12 and may compare corresponding location of the pixels impacted by the reflection to ascertain the likelihood that the reflection is caused by a machine presentation as opposed to a live presentation of the subject.

Two or more different image thresholding techniques can be used to convert the greyscale image to different resulting images in an embodiment of reflection detection. One of those thresholding techniques may be used to find features of the subject at 24 and another of those thresholding techniques may be used to find reflection at 214 in an embodiment. The predefined intensity level used to create one greyscale conversion for reflection detection 214 can be greater than the predefined level used for feature identification so that reflection that indicates the subject is not live can be detected at 214 and possibly located in the image. For example, the reflection detection predefined intensity level may be greater than 230.

Reflection detection 214 may determine whether the number or grouping of bright pixels (over the predefined level) in the greyscale conversion created for reflection detection 214 indicates that a reflection exists in the live image 12 that may be caused by a screen or other undesirable condition that exists in the image. For example, in an embodiment, a contiguous grouping of bright pixels that exceeds 10% of the total pixels in the image indicates that an undesirable reflection that may, for example, be caused by a screen, exist in the image and result in a determination that a reflection is detected at 214. In another embodiment, the location of the group of bright pixels may be used as an indicator that there is an undesirable reflection. For example, if the pixel grouping indicating a reflection exists primarily over the face of the subject that might be determined to be an undesirable reflection. Alternately, if the if the pixel grouping indicating a reflection exists primarily in the background of the face of the subject, that might indicate an undesirable reflection. In yet another example, a pixel grouping indicating a reflection that exists partially over the face of the subject and the partially over the background around the face in the image 12 might indicate an undesirable reflection.

In another embodiment, the intensity level found in the reflection detection greyscale conversion may be compared to the intensity level found in another image, which may be a stored image, for example, to determine whether indicates that a reflection exists. A template based matching function may correlate the live image 12 of the subject with the other image of the subject. Such a template based matching function may compare a stored face image against a live image 12 and, if the correlation between those images is low, because, for example, the coloring, brightness, or other feature of the images, particularly in the face image, is different, then the processor 950 executing the screen reflection detection routine at 214 may conclude that an undesirable reflection or reflections exist in the live image.

In yet another embodiment, the intensity level found in two or more images captured live, for example at the time that access is being requested, may be compared to detect reflection at 214. For example, where a reflection is detected in two or more images 12 in the same or a similar location, such detection may indicate that the reflection is from a screen and is undesirable such that access to that subject would be denied. Alternately, where a reflection is detected in two or more images 12 and that reflection is in a different location in each of those images 12, such detection may indicate that the reflection is from a screen and is undesirable. Other live detection, such as requiring the subject to move location and capture another image 12, determination of whether a screen shaped or finger shaped object appears in multiple images 12 at 216, or a determination of face background consistency at 218 may be used to assist in making the determination of whether the image 12 includes the live subject. It should be noted that use of certain live determination processes (such as 216 and 218) may be conditioned on a potential issue being detected in a prior process (such as 214 or, in the case of process 218, 216).

If nothing that appears to be associated with an attempt to fool the process 10 or system 910 is discovered, access may be permitted to the subject at 220 and if there is any apparent machine-machine or other issue that may be associated with an attempt to fool the process 10 or system 910, then access may be denied at 230.

The correlation between images may include a predetermined threshold for the brightness or color found in those images, below which it may be determined that a reflection exists. The correlation may furthermore be between the image 12 or the face of the subject in the image 12 and an average of more than one stored image 12 or face image.

The image 12, as used throughout this document, may furthermore be an average of two or more images. For example, the image 12 may be an average of several frames of video taken of the subject live, which may be averaged on a pixel by pixel brightness basis or another desired basis.

Apparatuses, systems, and methods for confirming that a subject is appearing live in the images may detect a shape that might indicate a device screen is being used to display one or more images or a video of the subject that the image authentication system or process is attempting to confirm is the person requesting access. For example, in one embodiment, image detection may determine whether a shape that indicates presence of a screen is present in one or more images. Such shapes could include, for example, straight lines or other shapes common to a machine that could display an image. Such shapes may furthermore be found in the segments of a segmented image. For example, in one embodiment, two or more straight lines that are directed to an intersection at nearly a 90 degree angle and appear in image space that surrounds the face of the subject indicate the possible use of a device screen to display the subject. The system may furthermore determine whether such a shape exists in two or more images, with more than one image displaying the shape indicating that a device screen may be in use to display the image.

Apparatuses, systems, and methods for confirming that a subject is appearing live in the images may detect a shape that indicates one or more fingers or portions of fingers are included in an image around a device screen used to display one or more images or a video of the subject for which the image authentication system or process is attempting to confirm is the person requesting access. For example, image detection may determine whether one or more shapes are found in the segments that are the shape of fingers are found adjacent one or more segments that could be screen edges, which could indicate it is likely that the presented image is created by a machine presentation and is not a live presentation of the subject.

Apparatuses, systems, and methods for confirming that a subject is appearing live in the images may also use the background behind or around the subject 218 to detect liveness. In background detection 218, the subject may be requested to perform an action, gesture or movement and then requested to perform the same action, gesture or movement in front of a different background. Image authentication may then determine whether the background behind the face or body of the subject changed, as it should if the subject is live in front of the camera, or whether the background behind the face or body of the subject remains the same in both the first and second actions, gestures, or movements, which would indicate that the subject is not live but is rather on a recording. For example, in one embodiment, a system might determine whether there is a change in the background when the subject is asked to move to another position for a second image capture. Such a change might include detection of a color, pattern, or another element, which might be sensed by, for example, one or more segments in an image or a change in the intensity of pixels in the background of the face by more than a predetermined amount. In such an embodiment, a lack of change in the background, after requesting that the subject move, for example, to stand in front of a different wall having a different color or pattern that the wall behind the subject in the first image or set of images captured, may indicate that the image is not a live rendering of the live subject, but is rather provided by a machine.

FIG. 5 illustrates a mobile device 300 that may be used in embodiments of image authentication, such as the systems and methods 10 and 100 and otherwise as described herein. The mobile device 300 illustrated includes a front camera 302, a rear camera 304, a screen 306, control buttons 308, and a flash 310. The mobile device 300 may also contain computing devices as described herein or otherwise included in such mobile devices 300, including a processor 950 or microprocessor and memory 962 and may have stored thereon various software applications. The mobile device may furthermore be handheld, as is illustrated in FIG. 5, or it may be formed in a wrist bound form, on glasses, or otherwise as desired. Thus, in one embodiment, image authentication software may be installed on the mobile device and may operate by requesting that the owner of the mobile device 300 provide a gallery of images of that owner. To capture an image of the owner, the owner may select whether one or more images (e.g. image 12 described herein) are to be acquired using the front camera 302 or the back camera 304. The owner may then hold the mobile device 300 at arms-length or another desired distance from the owner with the selected camera 302, 304 directed at the owner. The screen 306 may act as a view finder at this time and may show the image to be captured. The screen 306 may also include the outline of a shape. The owner may then move his or her arm, hand, or body to place his or her face in the center of the screen 306, possibly within the shape and extending to or nearly to the shape but not extending beyond or far beyond the shape. The owner may then actuate the camera 302, 304 so that the image shown on the screen is captured and stored in the memory of the mobile device 300. Such image capture may be performed both to create a gallery of images of the owner and to authenticate the owner as described herein.

Once a gallery of images of the owner have been taken and are stored in the mobile device 300, the image authentication system can be used to permit only the owner to access the mobile device 300 or any desired programs or functions of the mobile device 300. For example, if the owner wishes to make photographs stored on the mobile device 300 accessible only to the owner, the owner can establish the image authentication system as a gatekeeper for photographs on the mobile device 300. Then, when access to the photographs on the mobile device 300 is desired, the subject initiates the photograph storage aspect of the mobile device 300 and the mobile device will request that the requestor capture one or more images of the owner or other user having approved access using the mobile device 300 camera 302, 304. The image authentication system may further ask the requesting subject to move, act, or gesture. The image authentication system then determines whether the current subject matches the subject in the gallery. If the image authentication system determines the current subject does match the subject in the gallery then access is permitted to the photographs on the mobile device 300. If the image authentication system does not determine the current subject matches the subject in the gallery then access to the photographs on the mobile device 300 is denied.

FIG. 6 illustrates an embodiment of an image authentication system 400 to permit access. The image authentication system 400 illustrated includes a camera 402, a computing device 404 which may have any or all of the components illustrated in and discussed in connection with FIG. 8 or elsewhere herein, a screen 406, a speaker 408, a microphone 418, a position indicator 410, a door 412, and a lock for a bolt, magnetic closer, latch, or other locking mechanism 414.

In one embodiment, the image authentication system 400 may include software that is installed on the computing device 404 to limit access to the door 412. The image authentication system 400 may operate by requesting that a person presenting himself or herself for access through the door 412 further present himself or herself for approval for access.

The image authentication system 400 may be used to capture a gallery of images for each of a plurality of individuals who are approved for access. Those galleries may be stored in a data storage device contained in or otherwise associated with the computing device 404, associated for example by a local bus or over a wider network that may include the Internet.

When a person's gallery is stored in the image authentication system 400, an administrator of the image authentication system 400 may approve that person for access. That approved person may then present himself or herself and request access. The image authentication system 400 may then request that the person presented position himself or herself for image 12 acquisition to gain access approval. For example, the image authentication system 400 may request that the person stand with his or her toes on a position indicator 410 that is a line as shown in FIG. 6, facing the camera 402. The line or another position indicator 410 may assist with placing the subject at a location and distance from the camera 402 that enables the capture of an image of that subject. The image authentication system 400 may present requests to the subject in any way desired, including by voice commands provided from the computer 404 through the speaker 408 or through text or images displayed to the subject on the screen 406.

Once the subject requestor is positioned for image capture, the subject may inform the image authentication system 400 that an image should be captured by, for example, speaking a command or pushing a button, which may be associated with or appear on the screen 406. The camera may then be actuated to capture an image (e.g., image 12) of the subject.

Next, the image authentication system 400 may process the image captured and compare that image or the resultant data from the processed image to the gallery of images for that person or the processed data taken from those images. Such processing may be as described herein, such as with respect to the image 12 above and herein. The image authentication system 400 may further ask the requesting subject to move, act, or gesture. The image authentication system 400 then may determine whether the current subject is live or matches the subject in the gallery. If the image authentication system 400 determines the current subject does match the subject in the gallery and, if applicable, is live, then an actuator for the locking mechanism 414 is actuated to permit the door 412 to open so that access is permitted to the subject through the door 412. If the image authentication system 400 does not determine the current subject matches the subject in the gallery or is not live then access through the door 412 may be denied.

FIG. 7 illustrates an embodiment of an image authentication and information provision system 500 to confirm the identity of a subject and provide information related to that subject. For example, the image authentication system 500 may be used at an immigration checkpoint or other government counter to provide an immigration officer or other employee with pertinent information about the person presenting himself or herself; at a bank or other service counter to provide a service provider with information such as account information for a customer; or at a retail outlet where a customer loyalty card, credit card, or another form of identification may be used to confirm the identity of the person presenting herself or himself and provide the cashier or other employee with information that may make the customer's experience better or may help the retailer suggest additional purchases. The image authentication and information provision system 500 can include any device or function described herein and, as illustrated, includes a camera 502, a computing device 504 which may have any or all of the components illustrated in and discussed in connection with FIG. 8 or elsewhere herein, a screen 506, and a printer 508.

In one embodiment, the image authentication and information provision system 500 includes software that is installed on the computing device 504 to confirm the identity of the subject presenting herself or himself as described herein and may provide pertinent information regarding that person to a person to whom the subject is presenting himself or herself. The image authentication and information provision system 500 may operate by having an employee to whom the subject is presented himself or herself request that the subject place herself or himself and an identification of that person, which may be a passport, a customer loyalty card, or other identification that includes a photograph, in front of the camera 502.

The image authentication and information provision system 500 may process the image captured and compare that image or the resultant data from the processed image to the photograph in the identification. Such processing may be as described herein, such as with respect to the image 12 above and herein. The image authentication and information provision system 500 may further ask the requesting subject to move, act, or gesture. The image authentication and information provision system 500 then may determine whether the current subject is a live subject or matches the subject in the identification. If the image authentication and information provision system 500 determines the current subject does match the subject in the gallery then an affirmative match may be displayed on the screen 506 and pertinent information regarding that person may also be displayed on the screen 506. If the image authentication and information provision system 500 does not determine the current subject matches the subject in the identification then the lack of a confirmed match may be displayed on the screen 506.

Figure 8:
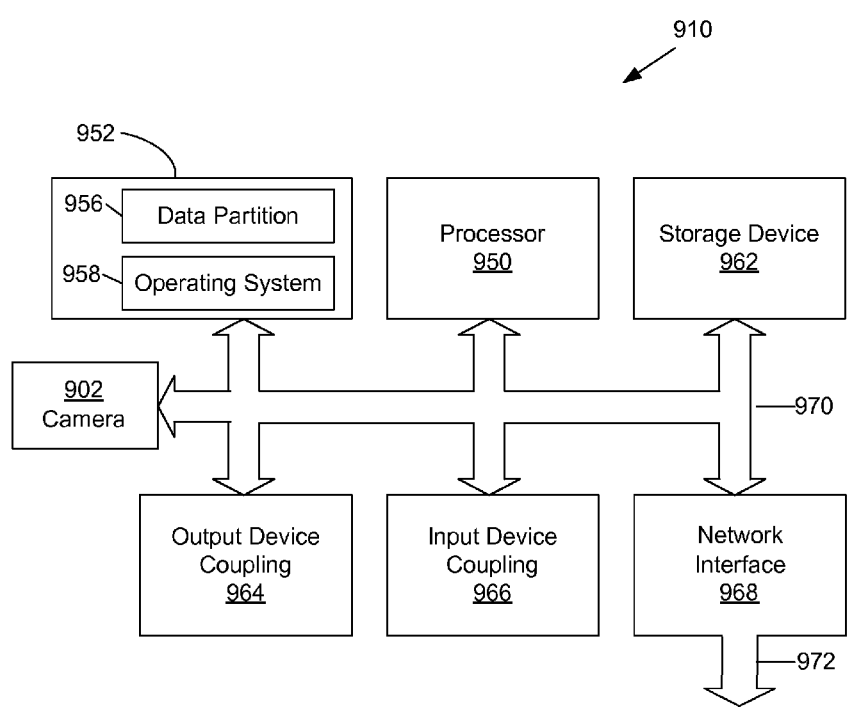
FIG. 8 illustrates an embodiment of computing device hardware for use in identity confirmation or subject liveness detection system.

FIG. 8 illustrates computing device hardware 910 that may be used in an embodiment of an image authentication system, such as one of the image authentication systems 10, 100, 400 described herein. As shown in FIG. 8, the computing device 910 may include a processor 950, memory 952, a storage device 962, a coupling for an output device 964, a coupling for an input device 966, a communication adaptor 968, and a camera 902. Communication between the processor 950, the storage device 962, the output device coupling 964, the input device coupling 966, and the communication adaptor 968 is accomplished by way of one or more communication busses 970. It should be recognized that the control circuitry 910 may have fewer components or more components than shown in FIG. 8. For example, if a user interface is not desired, the input device coupling 966 or output device coupling 964 may not be included with the control circuitry 910.

The memory 952 may, for example, include random access memory (RAM), dynamic RAM, or read only memory (ROM) (e.g., programmable ROM, erasable programmable ROM, or electronically erasable programmable ROM) and may store computer program instructions and information. The memory 952 may furthermore be partitioned into sections including an operating system partition 958 where system operating instructions are stored, and a data partition 956 in which data is stored.

The processor 950 may be any desired processor or microprocessor, including a processor in a mobile device or tablet or a processor in a general purpose computer or server. The processor 950 may, for example, be an Intel® type processor or another processor manufactured by, for example AMD®, DEC®, or Oracle®. The processor 950 may furthermore execute the program instructions and process the data stored in the memory 952. In one embodiment, the instructions are stored in memory 952 in a compressed or encrypted format. As used herein the phrase, "executed by a processor" is intended to encompass instructions stored in a compressed or encrypted format, as well as instructions that may be compiled or installed by an installer before being executed by the processor 950.

The storage device 962 may, for example, be non-volatile battery backed SRAM, a magnetic disk (e.g., hard drive), optical disk (e.g., CD-ROM) or any other device or signal that can store digital information. The communication adaptor 968 permits communication between the computer 910 and other devices or nodes coupled to the communication adaptor 968 at the communication adaptor port 972. The communication adaptor 968 may be a network interface that transfers information from a node such as a general purpose computer to the computing device 910 or from the computing device 910 to a node. It will be recognized that the computing device 910 may alternately or in addition be coupled directly to one or more other devices through one or more input/output adaptors (not shown).

The input device coupling 966 and output device coupling 964 may couple one or more input or output devices. It will be recognized, however, that the computing device 910 does not necessarily need to have an input device or an output device to operate. Moreover, the storage device 962 may also not be necessary for operation of the computer 910 as data may be stored in memory, for example. Data may also be stored remotely and accessed over a network, such as the Internet.

The elements 950, 952, 962, 964, 966, and 968 related to the computing device 910 may communicate by way of one or more communication busses 970. Those busses 970 may include, for example, a system bus or a peripheral component interface bus.

The camera 902 may be a variety of image acquisition devices and sensors, including, for example, a digital camera including a digital single-lens reflex (DSLR) camera, a camera in a mobile device such as an Android device or iPhone, a thermal camera, a photonic capture device, or another device that can capture an image and transfer that image to a processor 950 or storage device 952. The camera 902 may, in various embodiments, be any of the cameras described herein. The image authentication system described in one or more of the embodiments herein may select an image or video acquisition available on the device, adjusting, for example, aperture, lens length, shutter speed, and white balance on a DSLR camera or the high dynamic range setting, flash, and square format on an iOS device. For example, if the device on which image authentication is taking place is an iPhone, the image authentication system may select to have a video of the subject taken at high resolution with high dynamic range setting in square mode and may sense the light present on the subject to determine whether to turn on the flash. In one embodiment, such settings would be predetermined by the system configuration, while, in other embodiments, settings could be determined by a system user or by device configuration settings. In a higher quality camera, the image authentication system may select a resolution that is adequate for image authentication, but is not such a high resolution to cause issues, such as capture speed. For example, with some higher resolution cameras, full resolution images could cause undesirable delays in capture speed, image processing speeds, or image matching speed. The camera 902 may capture a visual image of the face of a person toward which the camera 902 is directed. The camera 902 may be any camera including a camera that is a part of a computer device, such as a mobile device or a tablet computing device, or may be a camera that captures an image digitally and transmits that image to a computing device.

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A live human detection system, comprising:
   a camera for capturing a plurality of current images of a human subject;
   a data storage device for storing a plurality of stored images of the human subject, each stored image including at least one of features of at least one eye of the human subject and data created from an image of at least one eye of the human subject;
   a subject identification device; and
   a processor coupled to the data storage device, the camera, and the subject identification device, the processor including instructions which, when executed by the processor, cause the processor to:
   receive a subject identification from the subject identification device;
   capture a plurality of current images from the camera, those images including at least one initial image, at least one intermediate image, and at least one later image, where at least one of the plurality of current images can be both an initial image and an intermediate image and at least one other of the plurality of current images can be both an intermediate image and a later image;
   convert each of the plurality of current images received from the camera to greyscale if the plurality of current images are in color;
   detect at least one of the eyes of the subject in each of the plurality of current images;
   determine whether an ocular region including one of the detected eyes in the at least one initial image matches a corresponding open eye in at least one of the stored images of the subject;
   determine whether an ocular region including one of the detected eyes in at least one intermediate image matches a corresponding closed eye in at least one of the stored images of the subject;
   determine whether an ocular region including one of the detected eyes in at least one later image matches the corresponding open eye in at least one of the stored images of the subject; and conclude that the subject is live and an approved subject if the ocular region including the at least one eye in the at least one initial image matches the corresponding open eye in at least one of the stored images of the subject, the ocular region including the at least one eye in at least one intermediate image matches a corresponding closed eye in at least one of the stored images of the subject, and ocular region including the at least one eye in at least one later image matches the corresponding open eye in at least one of the stored images of the subject.

2. The live human detection system of claim 1, further comprising:
an input device coupled to the processor; and
a display coupled to the processor; and
wherein the processor further includes instructions which, when executed by the processor, cause the processor to:
display one or more approved subjects on the display;
receive an input from the input device that indicates which displayed approved subject is the human subject presented; and
retrieve the stored image of the selected approved subject with one or more eyes closed and the stored image of the selected approved subject with one or more eyes open.

3. The live human detection system of claim 1, wherein the processor further includes instructions which, when executed by the processor, cause the processor to:
binarize each of the plurality of current images;
group contiguous pixels in each of the binarized plurality of current image into segments;
identify features of the ocular region including one of the detected eyes in each of the plurality of current images;
remove segments having fewer than a predetermined number of contiguous pixels from the features of the ocular region including one of the detected eyes;
mask each of the plurality of current images to remove segments around the ocular region including one of the detected eyes.

4. The system of claim 3, wherein the grouping of the contiguous pixels includes top hat segmenting the current image.

5. The live human detection system of claim 1, further comprising:
a blink-initiation device coupled to the processor; and
wherein the processor further includes instructions which, when executed by the processor, cause the processor to:
receive a blink-initiation signal from the blink initiation device; and
receive the plurality of current images from the camera after receiving the blink-initiation signal.

6. The live human detection system of claim 5, further comprising:
a speaker coupled to the processor; and
wherein the processor further includes instructions which, when executed by the processor, cause the processor to:
provide an audible countdown through the speaker; and
capture the plurality of images at at least one of during the countdown and after the countdown.

7. The live human detection system of claim 1, wherein the subject identification device is a touchscreen display for displaying list of approved subjects and on which the subject to be confirmed is to be selected from the list.

8. The live human detection system of claim 7, wherein the at least one later image is at least one of the last of the plurality of current images captured and at least one image captured consecutively before the last of the plurality of current images captured.

9. The live human detection system of claim 8, wherein the at least one initial image is at least one of the first of the plurality of current images captured and at least one image captured consecutively after the first of the plurality of current images captured.

10. The live human detection system of claim 1, wherein the at least one later image includes the last of the plurality of current images captured.

11. The live human detection system of claim 1, wherein the at least one initial image includes the first of the plurality of current images captured.

12. The live human detection system of claim 1, wherein the at least one intermediate image is captured after the first of the plurality of current images is captured and before the last of the plurality of current images is captured.

13. The live human detection system of claim 1, wherein the processor further includes instructions which, when executed by the processor, cause the processor to mask the ocular region surrounding and including the at least one eye after detecting the at least one eye of the subject in each of the plurality of images.

14. The live human detection system of claim 1, wherein the processor further includes instructions which, when executed by the processor, cause the processor to:
detect both eyes of the subject in each of the plurality of current images;
determine whether both eyes of the subject in an initial image match both corresponding open eyes in a stored image of the subject;
determine whether both eyes in an intermediate image match both corresponding closed eyes in a stored image of the subject;
determine whether both eyes in a later image match both corresponding open eyes in the stored image of the subject;
conclude that the subject is live and an approved subject if both eyes in the initial image match both corresponding open eyes in the stored image of the subject, both eyes in the intermediate image match both corresponding closed eyes in the stored image of the subject, and both eyes in the later image match both corresponding open eyes in the stored image of the subject.

15. The live human detection system of claim 14, wherein the function is an application.

16. The live human detection system of claim 1, wherein the processor further includes instructions which, when executed by the processor, cause the processor to access a function of a computing device.

17. The live human detection system of claim 1, further comprising:
determining a score based on the degree that the at least one initial image matches at least one of the stored images, the at least one intermediate image matches at least one of the stored images, and the at least one later image matches at least one of the stored images; and
wherein concluding that the subject is live and an approved subject further includes determining that the score is greater than a predetermined score.

18. The live human detection system of claim 1, wherein the binarizing of the current image includes determining the intensity of each pixel in the current image and causing all pixels having an intensity below a predetermined threshold to be black and causing all pixels having an intensity equal to or above the predetermined threshold to be white.

19. The live human detection system of claim 1, wherein:
the subject is further required to perform one of blink only one eye and blink both eyes sequentially;
both eyes of the subject are detected in each of the plurality of current images; and
concluding that the subject is live requires that the processor determine that both eyes in the at least one initial image match at least one of the stored images, that both eyes in the at least one intermediate image match at least one of the stored images, and that both eyes in the at least one later image match at least one of the stored images.

20. A method of live human detection, comprising:
receiving a subject identification from the subject identification device;
capturing a plurality of current images from a camera, those images including at least one initial image, at least one intermediate image, and at least one later image, where at least one of the plurality of current images can be both an initial image and an intermediate image and at least one other of the plurality of current images can be both an intermediate image and a later image;
converting each of the plurality of current images received from the camera to greyscale if the plurality of current images are in color;
detecting at least one of the eyes of the subject in each of the plurality of current images;
determining whether the at least one eye in an initial image matches a corresponding open eye in a stored image of the subject;
determining whether the at least one eye in an intermediate image matches a corresponding closed eye in a stored image of the subject;
determining whether the at least one eye in a later image matches the corresponding open eye in the stored image of the subject; and
concluding that the subject is live and an approved subject if the at least one eye in the initial image matches the corresponding open eye in the stored image of the subject, the at least one eye in the intermediate image matches the corresponding closed eye in the stored image of the subject, and the at least one eye in the later image matches the corresponding open eye in the stored image of the subject.

* * * * *